June 21, 1932. J. G. ZUBER 1,863,891
PHOTOGRAPHIC CAMERA SUPPORT
Filed Nov. 13, 1930
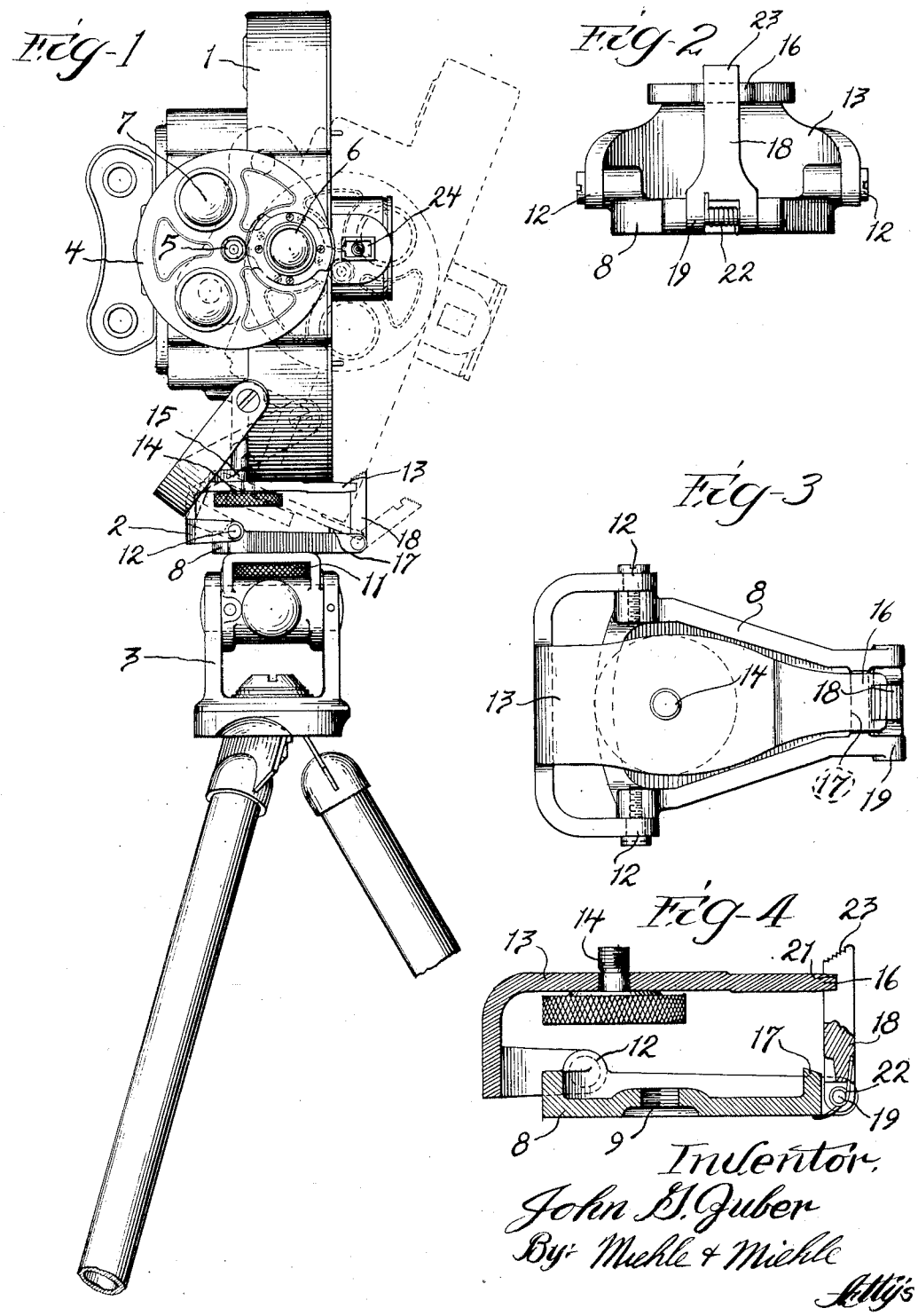
Inventor,
John G. Zuber
By: Miehle & Miehle
Atty's Patented June 21, 1932

1,863,891

UNITED STATES PATENT OFFICE

JOHN G. ZUBER, OF CHICAGO, ILLINOIS, ASSIGNOR TO BELL & HOWELL COMPANY, OF CHICAGO, ILLINOIS, A CORPORATION OF ILLINOIS

PHOTOGRAPHIC CAMERA SUPPORT

Application filed November 13, 1930. Serial No. 495,443.

My invention relates particularly to photographic cameras wherein a photographic lens on the camera is shiftable in a plane normal to the photographic axis of the camera to and from photographing and focusing positions, although not limited to this use alone.

The objects of my invention reside in the provision of a novel and effective device whereby a photographic camera is pivotally mounted for shifting movement and predeterminately positioned in two positions of such movement, which device is preferably in the form of a compact and convenient accessory or attachment adapted to be interposed between a camera and its supporting tripod, and which, as associated with a camera of the above type, provides for positioning a photographic lens on the camera in the same position with reference to a subject to be photographed in either position of the lens on the camera whereby to provide for the visual critical focusing of the lens in the same position in which the photograph is to be taken.

With these objects in view my invention consists in certain features of novelty in the construction, combination and arrangement of parts by which the said objects and certain other objects, hereinafter appearing, are effected, all as fully described with reference to the accompanying drawing and more particularly pointed out in the appended claims.

In the said drawing:—

Figure 1 is a partial front elevation of a motion picture camera assembled with the device of my invention upon a tripod;

Figure 2 is a side elevation of the device of my invention;

Figure 3 is a top plan view of the same; and,

Figure 4 is a central vertical section of the same.

Like characters of reference indicate like parts in the several views.

Referring to the drawing, 1 designates a motion picture camera which is carried on the device of my invention, generally designated at 2, and which device in turn is mounted on a tripod, generally designated at 3. See Figure 1.

The camera 1 is a well known type and is provided with a plural lens turret 4 mounted on the front of the camera for angular movement on an axis parallel to the photographic axis of the camera, as designated at 5, for selectively and predeterminately shifting photographic lenses, mounted on the turret, into photographing position, a photographic lens 6 being shown in Figure 1 in photographing position on the camera.

The camera is provided with a visual or critical focusing device, not shown, with which the lens 6 is alined when the lens is positioned out of photographing position on the camera and in the position in the movement thereof with the turret indicated at 7.

Thus, the lens 6 is shiftable on the camera to and from photographing and focusing positions, in a plane normal to the photographic axis of the camera, and it will be observed that unless the camera is shifted the photographing and focusing positions of the lens 6 are not the same.

The device 2 of my invention provides for the predeterminately shifting of the camera so that the photographic lens is in the same position with reference to a subject to be photographed in either of the said positions of the lens on the camera with resulting accuracy in focusing.

The device 2 of my invention consists as follows. A base member 8 is provided with a standard screwthreaded bore camera mount formation 9, see Figure 4, by means of which it is detachably mounted on the tripod 3 which is provided with a standard camera screw mount structure generally indicated at 11, see Figure 1.

Pivotally mounted on the base member 8, on an axis normal to an axial plane of the mount formation 9, as designated at 12, is a camera carrying member 13 overlying the base member. The camera carrying member 13 is provided with a standard screw mount structure 14 disposed correspondingly with the camera mount formation 9 by means of which the camera 1, which is provided with a standard screwthreaded bore camera mount formation generally indicated at 15, is mounted on the carrying member.

The camera 1 is so mounted on the carrying member 13 that its photographic axis is parallel to the pivotal axis 12 of the carrying member and the arrangement is such that the photographing and focusing positions of the lens 6 on the camera are disposed on an arc having its axis coincident with the pivot 12, so that the lens 6 may be positioned in the same position in either of its said positions on the camera.

Figure 1 shows in full lines the upright or photographing position of the camera and in broken lines the tilted or focusing position thereof, the lens 6 being in the same position due to its having been shifted by angular movement of the turret 4.

In order to predeterminately position the camera in the photographing and focusing positions thereof, the following is provided.

The end of the carrying member 13 distant from the pivot 12, as designated at 16, is engageable downwardly upon a stop formation 17 on the base member 8 to predeterminately position the carrying member and camera mounted thereon in tilted or focusing position, as shown in broken lines in Figure 1, the weight of the camera acting thereagainst.

A latch member 18 is pivotally mounted, as designated at 19, on the end of the base member 8 corresponding with the end 16 of the carrying member, on an axis parallel to that of the pivot 12. This latch member projects upwardly from the pivot 19 and is provided with a transverse slot 21 adjacent its upper end which is engageable with the end 16 of the carrying member 13 to predeterminately position the camera and carrying member in upright or photographing position.

A torsion spring 22 is associated with the pivot 19 and yieldably urges the latch member 18 into operative position, the upper end of the latch member being provided with a finger engaging portion 23 for moving the latch member into inoperative or releasing position to permit movement of the camera into focusing position, and the latch member, due to the spring 22, automatically engaging the slot 21 with the end 16 as the camera is moved into photographing position.

In operation, the camera, while in upright or photographing position, is trained on the subject to be photographed by means of the view finder of the camera generally indicated at 24. Then the camera is shifted to focusing position by release of the latch 18. In this position and with the lens 6 in focusing position the lens is focused, after which the camera is moved to phographing position and the lens is shifted thereon to photographing position, whereupon the photograph may be taken.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a photographic camera support the combination with a base member, of a camera carrying member pivotally mounted thereon, and means for predeterminately positioning said carrying member with reference to said base member in two positions of the pivotal movement of said carrying member.

2. In a photographic camera support the combination with a base member, of a camera carrying member pivotally mounted thereon, and means for predeterminately positioning said carrying member with reference to said base member in two positions comprising a stop providing one of said positions and a releasable latch member operative between said base and carrying members to provide the other of said positions.

3. In a photographic camera support the combination with a base member provided with a standard screwthreaded bore camera mount formation by which it may be mounted on a camera tripod, of a camera carrying member pivotally mounted on said base member on an axis normal to an axial plane of said mount formation and provided with a standard camera screw mount structure disposed correspondingly with said camera mount formation for the mounting of a photographic camera thereon, and means for predeterminately positioning said carrying member with reference to said base member in two positions of the pivotal movement of said carrying member.

4. In a photographic camera support the combination with a base member provided with a standard screwthreaded bore camera mount formation by which it may be mounted on a camera tripod, of a camera carrying member pivotally mounted on said base member on an axis normal to an axial plane of said mount formation and provided with a standard camera screw mount structure disposed correspondingly with said camera mount formation for the mounting of a photographic camera thereon, and means for predeterminately positioning said carrying member with reference to said base member in two positions of the pivotal movement of said carrying member comprising a stop against which the weight of the camera acts to provide one of said positions and an automatically engaging spring pressed releasable latch providing the other of said positions.

5. In a photographic camera support the combination with a base member, of a camera carrying member pivotally mounted thereon, means for securing a photographic camera on said carrying member with the photographic axis of the camera parallel with the pivotal axis of said carrying member, and means for predeterminately positioning said carrying member with reference to said base member in two positions of the pivotal movement of said carrying member.

6. In a photographic camera support the combination with a base member, of a camera carrying member pivotally mounted thereon, means for securing a photographic camera on said carrying member with the photographic axis of the camera parallel with the pivotal axis of said carrying member, and means for predeterminately positioning said carrying member with reference to said base member comprising a releasable latch.

7. In a photographic camera support the combination with a base member, of a camera carrying member pivotally mounted thereon on a horizontal axis, means for securing a photographic camera on said carrying member with the photographic axis of the camera parallel with the pivotal axis of said carrying member, and means for predeterminately positioning said carrying member with reference to said base member in two positions of the pivotal movement of said carrying member comprising a stop against which the weight of the camera acts to provide one of said positions and a releasable latch providing the other of said positions.

8. In a photographic camera support the combination with a base member, of a camera carrying member pivotally mounted thereon on a horizontal axis, means for securing a photographic camera on said carrying member in upwardly projecting relation therewith and with the photographic axis of the camera parallel with the pivotal axis of said carrying member, and means for predeterminately positioning said carrying member with reference to said base member in two positions of the pivotal movement of said carrying member comprising a stop against which the weight of the camera acts to provide one of said positions and an automatically engaging releasable latch providing the other of said positions.

9. In a device of the character described the combination with a photographic camera provided with means for shifting a photographic lens thereon in a plane normal to the photographic axis of the camera to and from photographing and focusing positions, of means whereby said camera is pivotally mounted on an axis parallel to the photographic axis thereof for the positioning of said photographic lens in the same position in either of its said positions on the camera.

10. In a device of the character described the combination with a photographic camera provided with means for shifting a photographic lens thereon in a plane normal to the photographic axis of the camera to and from photographing and focusing positions, of means whereby said camera is pivotally mounted on an axis parallel to the photographic axis thereof for the positioning of said photographic lens in the same position in either of its said positions on the camera, and means for predeterminately positioning said camera in its said pivotal movement to predeterminately position said photographic lens in said same position in either of its said positions on the camera.

11. In a device of the character described the combination with a photographic camera provided with means for shifting a photographic lens thereon in a plane normal to the photographic axis of the camera to and from photographing and focusing positions, of means whereby said camera is pivotally mounted on an axis parallel to the photographic axis thereof for the positioning of said photographic lens in the same position in either of its said positions on the camera, and means for predeterminately positioning said camera in its said pivotal movement to predeterminately position said photographic lens in said same position in either of its said positions on the camera comprising a stop against which the weight of the camera acts for one position thereof and a releasable latch for the other position.

12. In a device of the character described the combination with a photographic camera provided with means for shifting a photographic lens thereon in a plane normal to the photographic axis of the camera to and from photographing and focusing positions, of means whereby said camera is pivotally mounted on a downwardly disposed axis parallel to the photographic axis thereof for the positioning of said photographic lens in the same position in either of its said positions on the camera, and means for predeterminately positioning said camera in its said pivotal movement to predeterminately position said photographic lens in the same position in either of its said positions on the camera comprising a stop against which the weight of the camera acts in focusing position and a releasable automatically engaging latch for the photographing position of the camera.

In witness whereof I hereunto affix my signature this 7th day of November 1930.

JOHN G. ZUBER.